US012428883B2

(12) United States Patent
Shinohara

(10) Patent No.: US 12,428,883 B2
(45) Date of Patent: Sep. 30, 2025

(54) DOOR LATCH DEVICE

(71) Applicant: MITSUI KINZOKU ACT CORPORATION, Kanagawa (JP)

(72) Inventor: Takuya Shinohara, Kanagawa (JP)

(73) Assignee: MITSUI KINZOKU ACT CORPORATION, Kanagawa (JP)

(*) Notice: Subject to any disclaimer, the term of this patent is extended or adjusted under 35 U.S.C. 154(b) by 77 days.

(21) Appl. No.: 18/312,798

(22) Filed: May 5, 2023

(65) Prior Publication Data

US 2023/0407687 A1 Dec. 21, 2023

(30) Foreign Application Priority Data

May 19, 2022 (JP) ................................ 2022-082086

(51) Int. Cl.
*E05B 85/26* (2014.01)
*E05B 77/06* (2014.01)
*E05B 85/02* (2014.01)
*E05B 85/10* (2014.01)

(52) U.S. Cl.
CPC .............. *E05B 85/26* (2013.01); *E05B 77/06* (2013.01); *E05B 85/02* (2013.01); *E05B 85/10* (2013.01)

(58) Field of Classification Search
CPC .......... E05B 77/02; E05B 77/04; E05B 77/06; E05B 77/30; E05B 79/08; E05B 81/16
See application file for complete search history.

(56) References Cited

U.S. PATENT DOCUMENTS

| | | | | |
|---|---|---|---|---|
| 10,907,384 | B2 * | 2/2021 | Damboiu | E05B 81/42 |
| 11,608,660 | B2 * | 3/2023 | Graute | E05B 77/06 |
| 2022/0268062 | A1 * | 8/2022 | Shinohara | E05B 85/26 |
| 2023/0407687 | A1 * | 12/2023 | Shinohara | E05B 81/16 |

FOREIGN PATENT DOCUMENTS

| | | | | |
|---|---|---|---|---|
| DE | 202020100098 U1 * | 3/2020 | E05B 81/25 |
| JP | 2004-50919 A | 2/2004 | |
| JP | 2021059923 A * | 4/2021 | E05B 77/06 |
| WO | 2021070401 A1 | 4/2021 | |

* cited by examiner

*Primary Examiner* — Christine M Mills
*Assistant Examiner* — Yahya Sidky
(74) *Attorney, Agent, or Firm* — Rimon P.C.

(57) ABSTRACT

A door latch device includes: an open link; and a ratchet lever, the open link including: a lever body; an inertial lever portion; and a bias member configured to bias the inertial lever portion relative to the lever body, wherein a support shaft portion is provided at one of the lever body and the inertial lever portion and an insertion portion having an insertion hole is provided in the other, and wherein an engagement mechanism is provided between the support shaft portion and the insertion portion, the engagement mechanism being configured to permit insertion/removal of the support shaft portion to/from the insertion hole when the inertial lever portion is located at a predetermined attachment/detachment position relative to the lever body, and prevent the insertion/removal of the support shaft portion to/from the insertion hole when the inertial lever portion is arranged at an operating position and a non-operating position.

7 Claims, 14 Drawing Sheets

UNLOCKED STATE

OPERATING POSITION (ATTACHMENT/DETACHMENT POSITION)

DOOR LATCH DEVICE

CROSS-REFERENCE TO RELATED APPLICATION(S)

The present application claims priority to and incorporates by reference the entire contents of Japanese Patent Application No. 2022-082086 filed in Japan on May 19, 2022.

BACKGROUND

1. Field

The present disclosure relates to a door latch device.

2. Related Art

A door latch device including a lever body and an inertial lever portion to constitute an open link has already been provided. In this door latch device, the inertial lever portion is arranged at an operating position by biasing means, for normal use. When the inertial lever portion is arranged at the operating position and the lever body is arranged at an unlock position, performance of opening operation of the door handle causes the inertial lever portion to abut on a ratchet lever, the ratchet lever is operated to be released, and an engagement state of a ratchet to a latch is released. Meanwhile, when an impact force is applied to a vehicle, the inertial lever portion rotates relative to the lever body against a biasing force of the biasing means, and is arranged at a non-operating position. In a state where the inertial lever portion is arranged at the non-operating position, the inertial lever portion does not abut on the ratchet lever even when the lever body is arranged at the unlock position. Therefore, the ratchet is kept being engaged with the latch, preventing a situation in which the door is unexpectedly opened (e.g., see JP 2021-59923 A).

Incidentally, the door latch device configured to be arranged inside a door of an automobile is greatly restricted in external dimensions, and reduction in size of individual components housed inside a case is also required. Therefore, in manufacturing the door latch device, assembling a large number of downsized components is required, complicating assembling work. In particular, in the door latch device having the open link including the lever body and the inertial lever portion, it is necessary to insert a support shaft portion of the lever body through a screw insertion hole provided in the inertial lever portion and further to threadedly engage a retaining screw at an end of the support shaft portion, and there is a concern about further complication of a manufacturing operation.

There is a need for a door latch device that may suppress complication of manufacturing operation.

SUMMARY

In some embodiments, a door latch device includes: an open link configured to change to an unlocked state and a locked state and operate upon opening operation of a door handle; and a ratchet lever configured to release an engagement state of a ratchet with a latch when an operation force is applied via the open link, the open link including: a lever body configured to displace to an unlock position corresponding to the unlocked state and a lock position corresponding to the locked state and move according to an opening operation of the door handle; an inertial lever portion configured to rotate relative to the lever body about a predetermined axis to move to an operating position and a non-operating position; and a bias member configured to bias the inertial lever portion relative to the lever body in a rotation direction such that the inertial lever portion is maintained at the operating position, wherein the operation force is transmitted to the ratchet lever only when the opening operation of the door handle is performed while the lever body is arranged at the unlock position and the inertial lever portion is arranged at the operating position, wherein a support shaft portion is provided at one of the lever body and the inertial lever portion, and an insertion portion having an insertion hole is provided in the other of the lever body and the inertial lever portion, the insertion portion being externally fitted around the support shaft portion through the insertion hole to arrange the lever body and the inertial lever portion so as to be rotatable relative to each other, and wherein an engagement mechanism is provided between the support shaft portion and the insertion portion, the engagement mechanism being configured to permit insertion/removal of the support shaft portion to/from the insertion hole when the inertial lever portion is located at a predetermined attachment/detachment position relative to the lever body, and prevent the insertion/removal of the support shaft portion to/from the insertion hole when the inertial lever portion is arranged at the operating position and the non-operating position.

The above and other objects, features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 6A is viewed from inside the vehicle and FIG. 6B is viewed obliquely from below;

FIG. 7A is viewed from inside the vehicle and FIG. 7B is viewed obliquely from below;

FIG. 11A is viewed from inside the vehicle, FIG. 11B is viewed from a back side of the vehicle, and FIG. 11C is viewed from above the vehicle;

FIG. 12A is viewed from inside the vehicle, FIG. 12B is viewed from a back side of the vehicle, and FIG. 12C is viewed from above the vehicle;

FIG. 13A is viewed from inside the vehicle, FIG. 13B is viewed from a back side of the vehicle, and FIG. 13C is viewed from above the vehicle; FIG. 14A is a perspective view of the inertial lever portion arranged at the operating position and FIG. 14B is a perspective view of the inertial lever portion arranged at the non-operating position.

DETAILED DESCRIPTION

Preferred embodiments of a door latch device according to the present disclosure will be described in detail with reference to the accompanying drawings. Note that in the following description, for the sake of convenience, directions are indicated in a state of being mounted on a vehicle.

Figure 1:
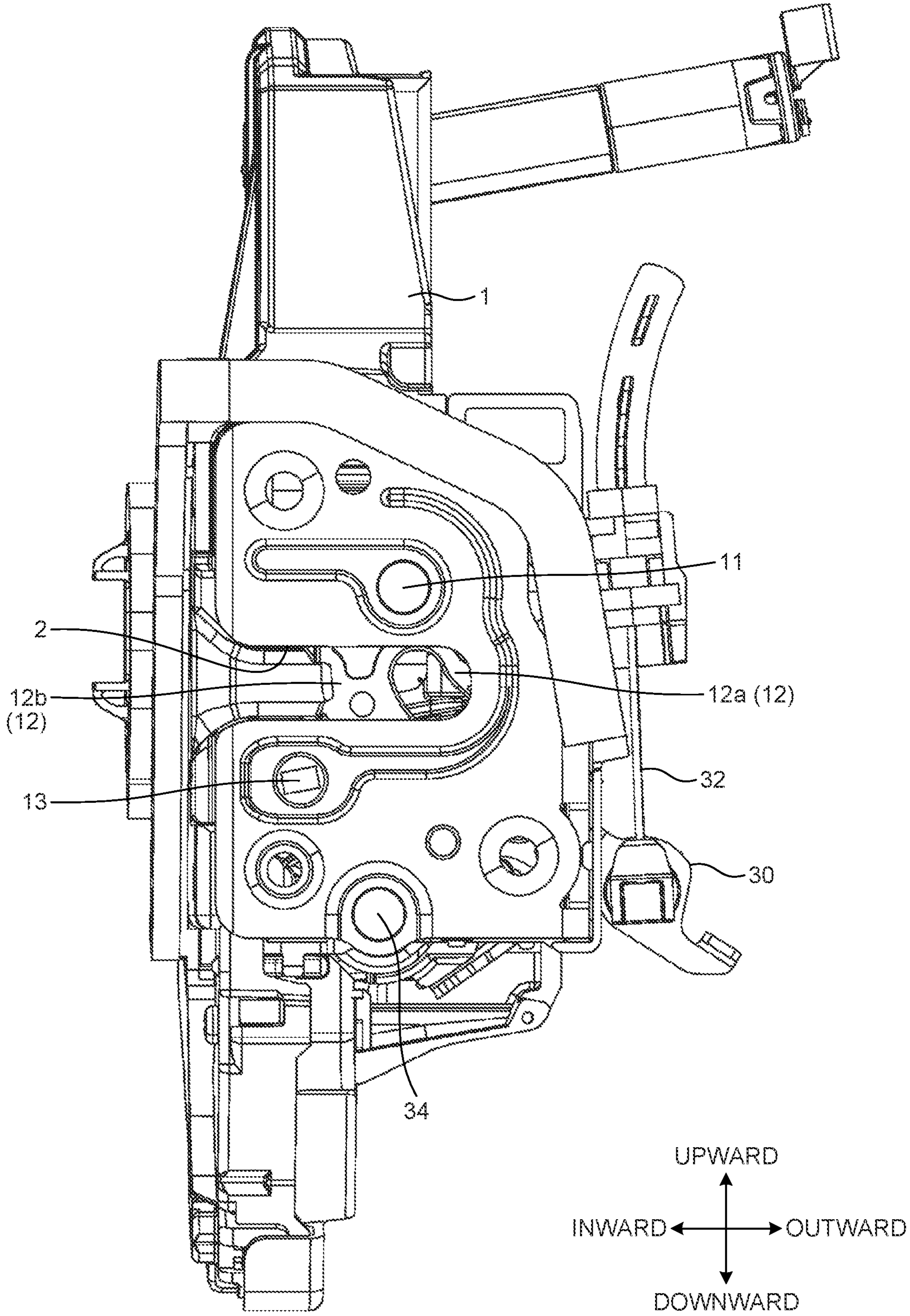
FIG. 1 is a view illustrating an appearance of a door latch device according to an embodiment of the present disclosure as viewed from a back side of a vehicle.
Figure 2:
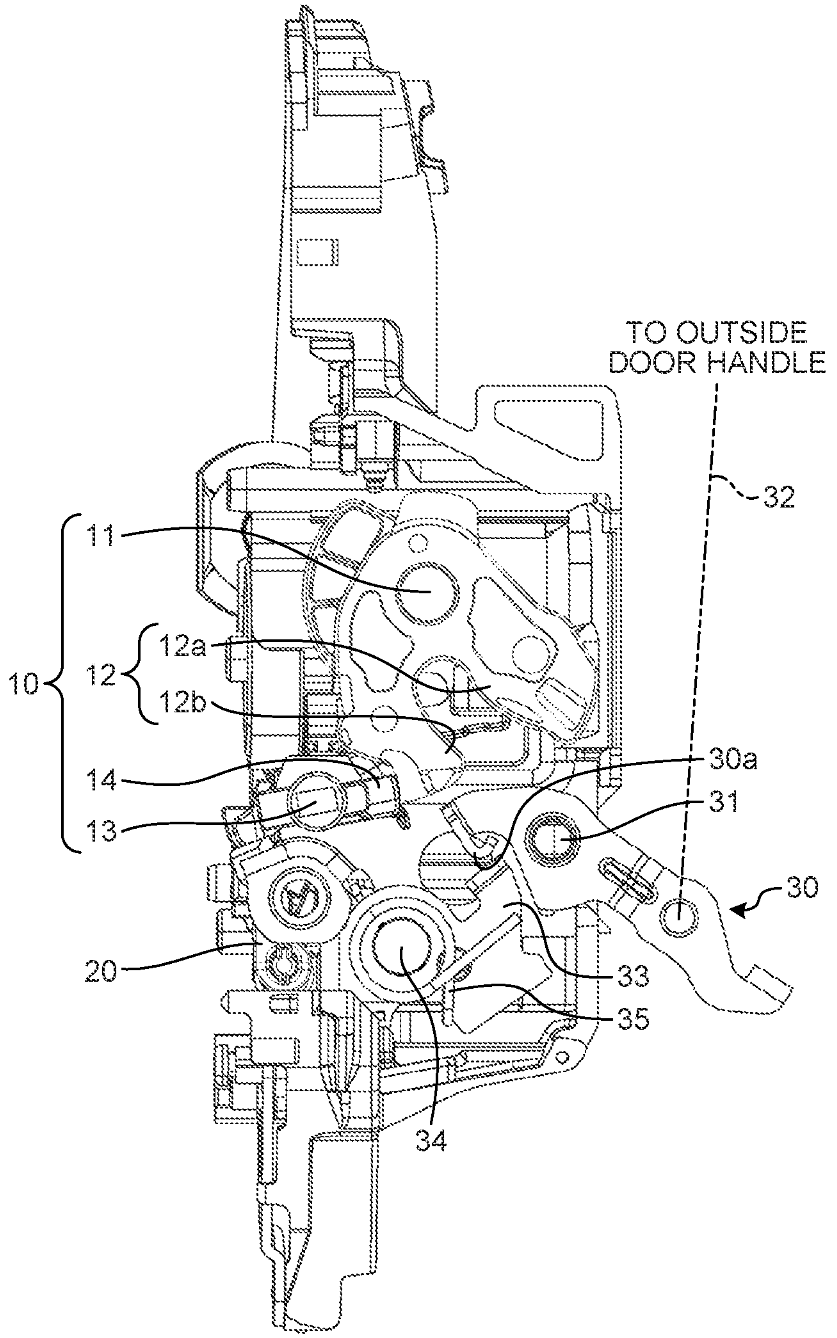
FIG. 2 is a view of the door latch device of FIG. 1 with a case partially omitted.
Figure 2:
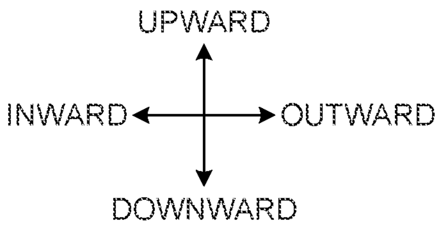
Figure 3:
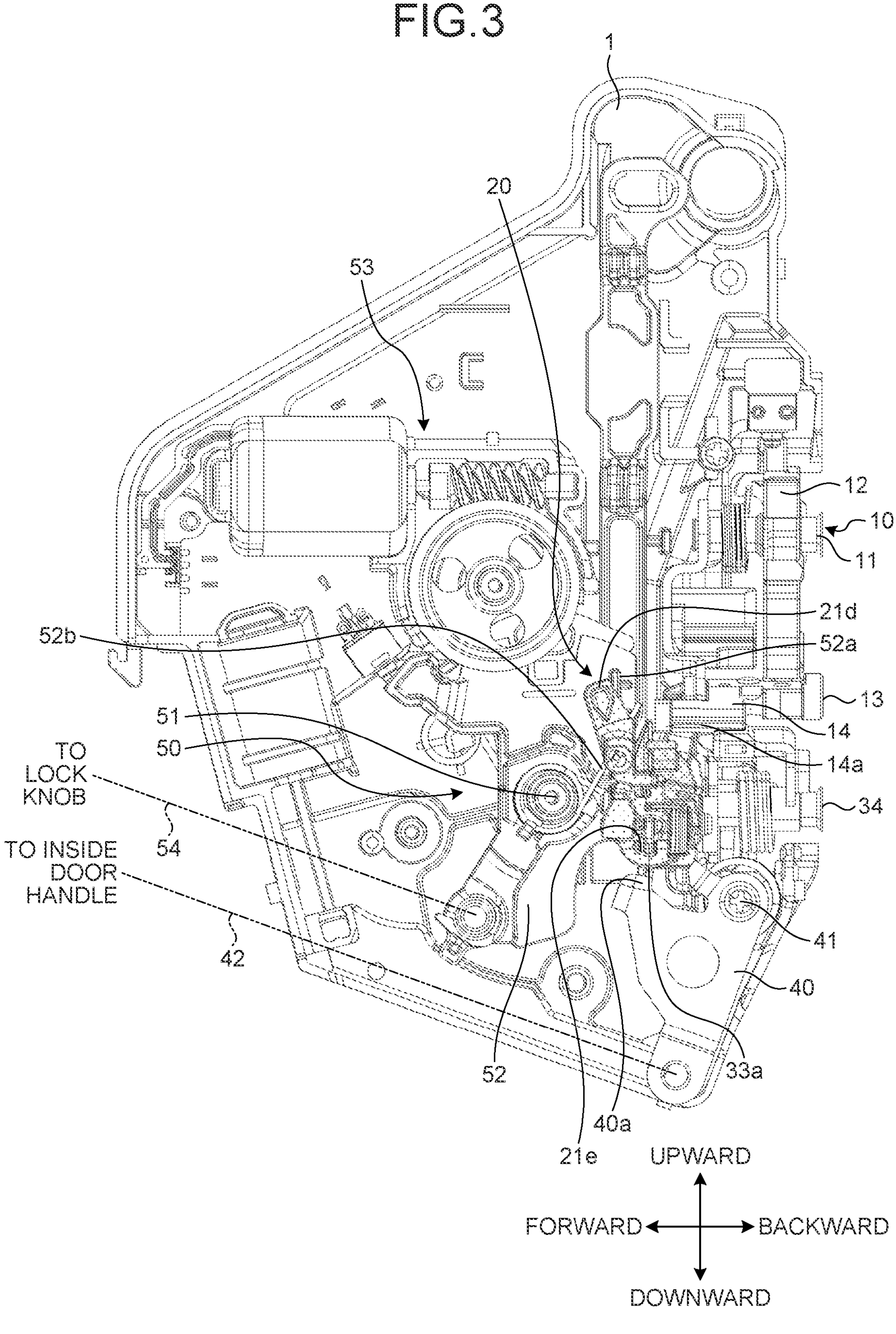
FIG. 3 is a view of an internal structure of the door latch device illustrated in FIG. 1 as viewed from inside the vehicle.

FIGS. 1 to 3 each illustrate a door latch device according to an embodiment of the present disclosure. Although not illustrated, the door latch device exemplified here is mounted on a front hinged side door arranged on the right side of a four-wheeled vehicle, and performs opening/closing control of the side door by changing an engagement state with a striker provided at the vehicle according to an opening operation of a door handle or a locking/unlocking operation using a key. In the door latch device, a latch unit 10 is provided inside a case 1.

The latch unit 10 includes a latch 12 that is arranged rotatably via a latch shaft 11 and a ratchet 14 that is arranged rotatably via a ratchet shaft 13. The latch shaft 11 and the ratchet shaft 13 each extend substantially horizontally in a longitudinal direction of the vehicle. In the present embodiment, the latch shaft 11 is provided at a portion of the vehicle positioned above a striker entrance groove 2 of the case 1, and the ratchet shaft 13 is provided at a portion of the vehicle inward from the latch shaft 11 in a portion of the vehicle positioned below the striker entrance groove 2. The striker (not illustrated) enters the striker entrance groove 2 relatively from the left side in FIG. 1, which is the inside of the vehicle, by a closing operation of the side door.

The latch 12 includes a striker abutment portion 12*a* and a hook portion 12*b*, and is biased in a release direction (clockwise in FIG. 2) by a spring force of a latch spring which is not illustrated and is arranged at a meshing standby position. The meshing standby position represents a state in which the hook portion 12*b* is retracted to the upper side of the striker entrance groove 2 while the striker abutment portion 12*a* is arranged on the back side (right side in FIG. 2) of the striker entrance groove 2. When the side door is closed and the striker enters the striker entrance groove 2, the striker abuts on the striker abutment portion 12*a*, and therefore, the latch 12 rotates counterclockwise in FIG. 2 against the spring force of the latch spring, and the hook portion 12*b* is arranged across an opening side portion of the striker entrance groove 2.

When the hook portion 12*b* of the latch 12 is arranged across the striker entrance groove 2, the ratchet 14 engages with the hook portion 12*b*, and the latch 12 is prevented from rotating in the release direction. The ratchet 14 is biased in a direction (counterclockwise in FIG. 2) to engage with the latch 12 by a spring force of a ratchet spring which is not illustrated. Therefore, when the striker enters the striker entrance groove 2 and the hook portion 12*b* of the latch 12 is arranged across the striker entrance groove 2, the spring force of the ratchet spring engages the ratchet 14 with the hook portion 12*b*, and this state is maintained.

Figure 4:
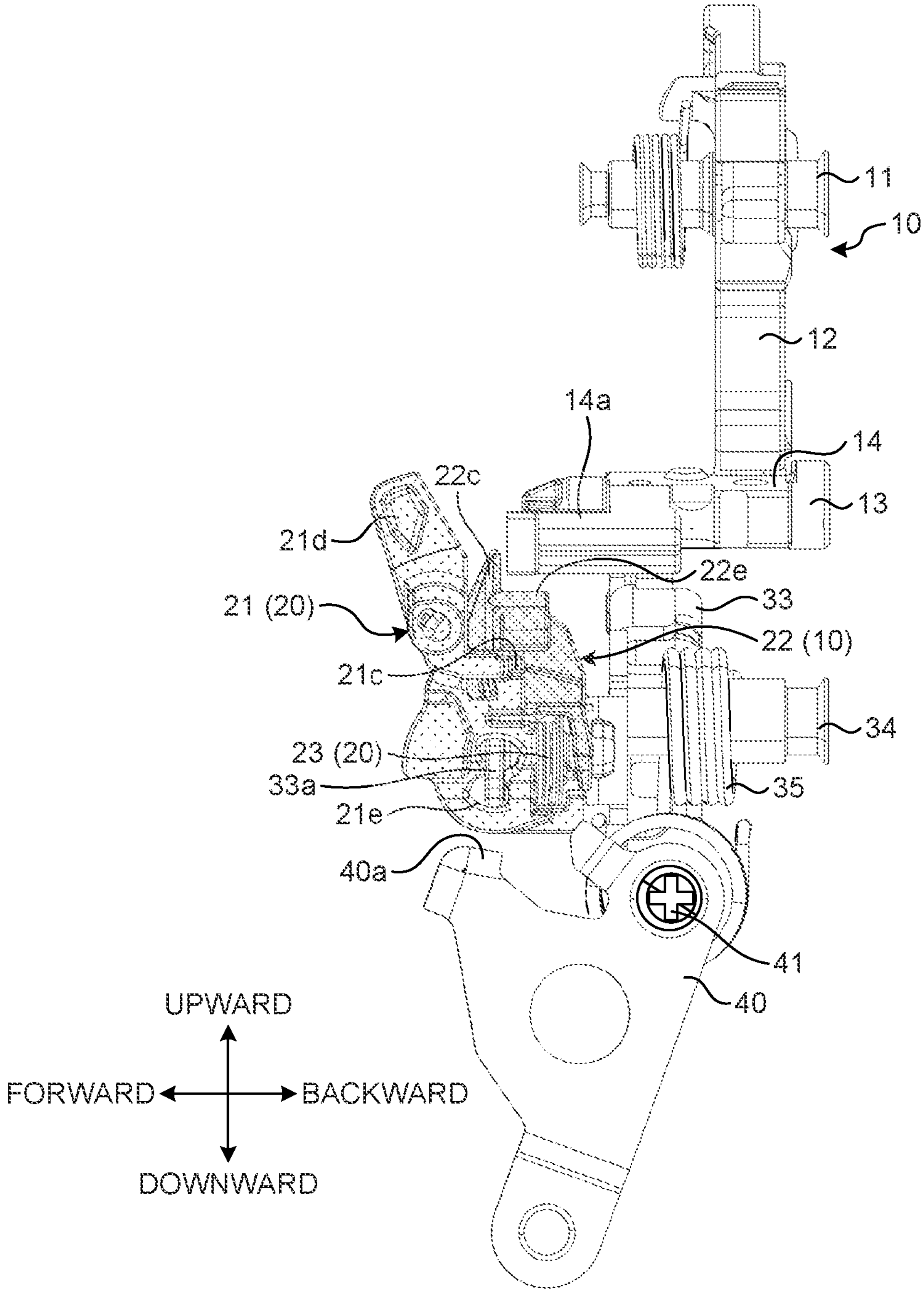
FIG. 4 is a view of a main part of the internal structure of the door latch device illustrated in FIG. 1 as viewed from inside the vehicle, the door latch device being in an unlocked state.
Figure 5:
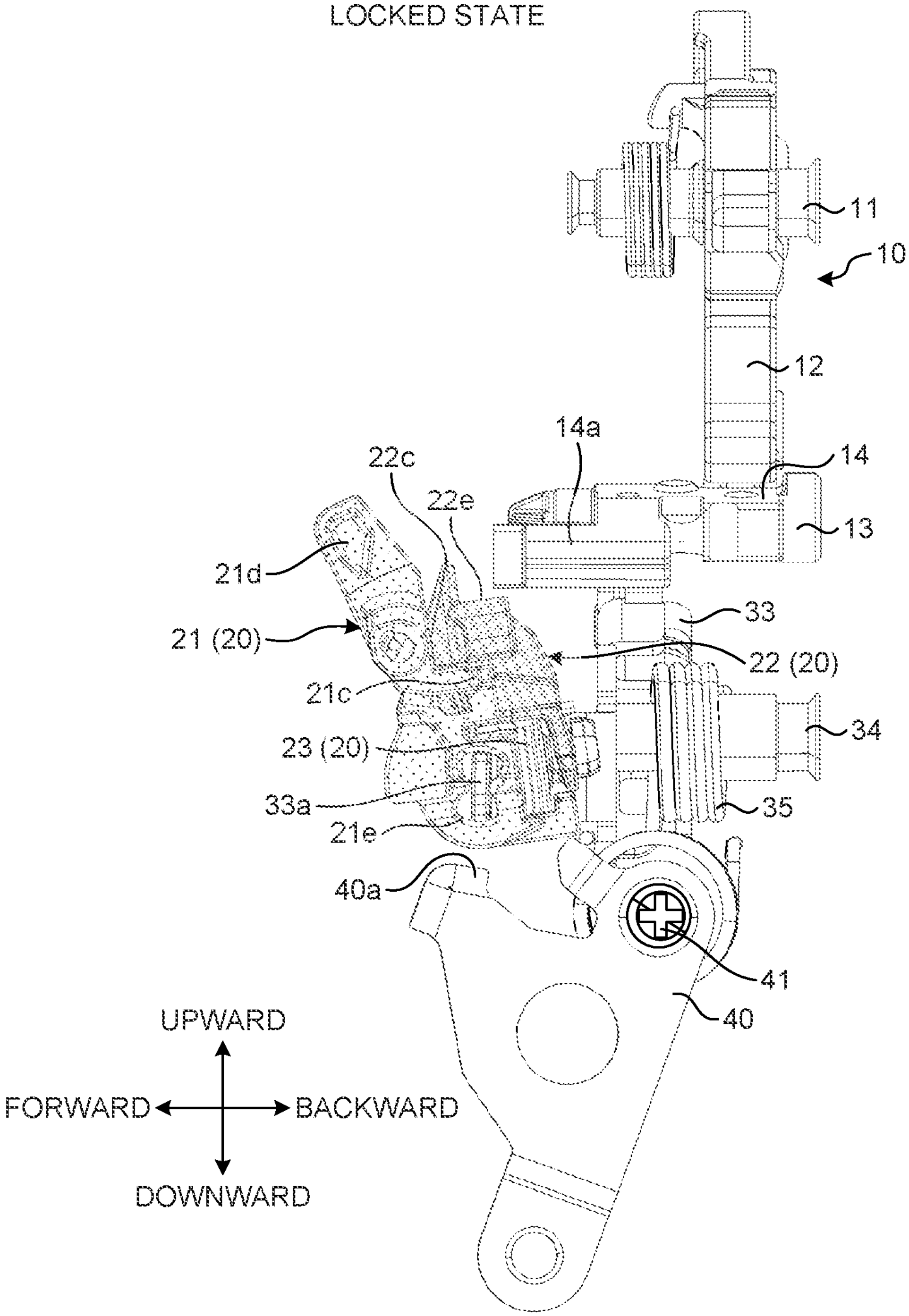
FIG. 5 is a view of the main part of the internal structure of the door latch device illustrated in FIG. 1 as viewed from inside the vehicle, the door latch device being in a locked state.
Figure 6B:
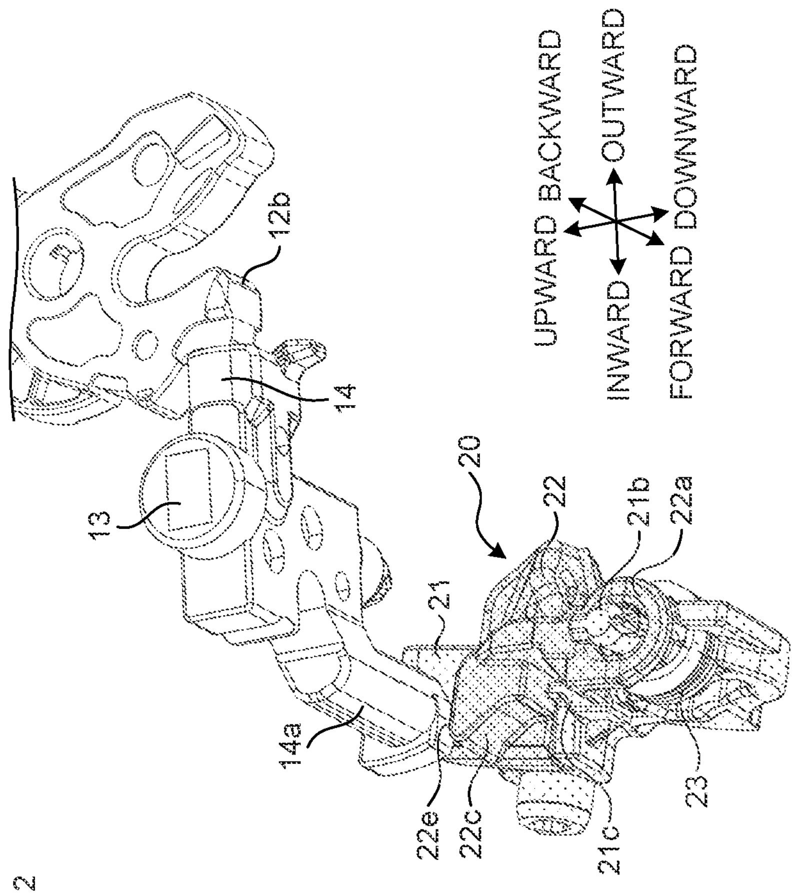
FIGS. 6A and 6B are views of the main part of the internal structure, illustrating the inertial lever portion at an operating position in an open link of the door latch device illustrated in FIG. 1, where
Figure 6A:
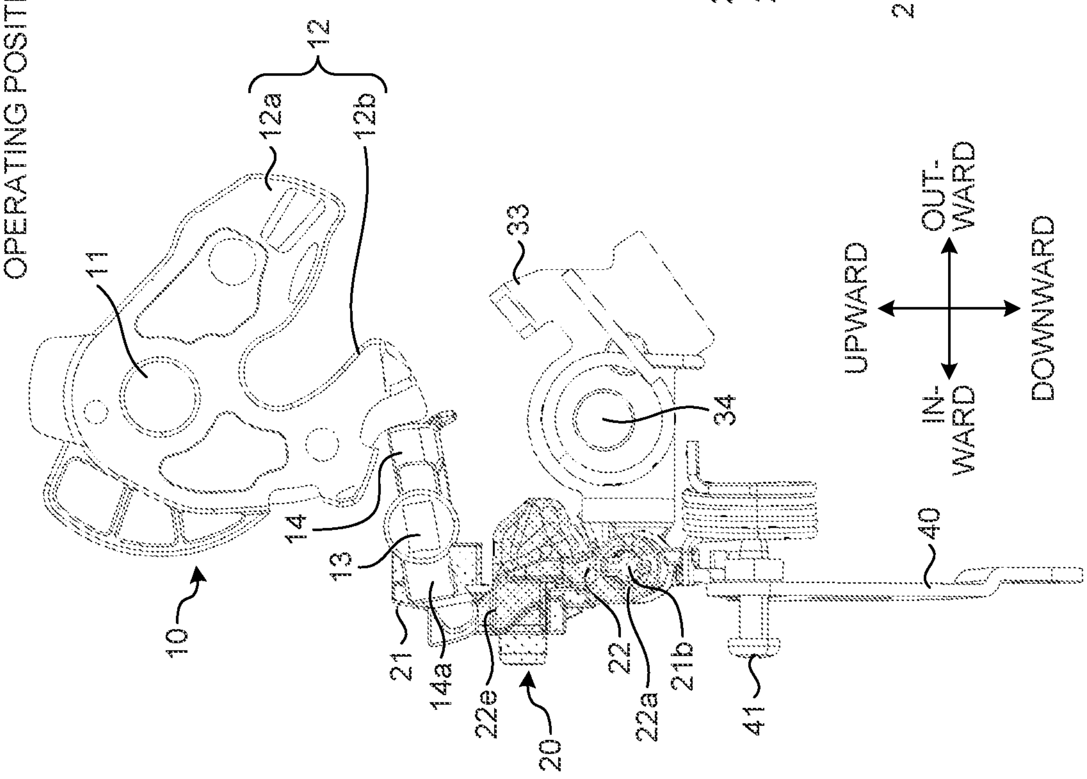
Figure 7B:
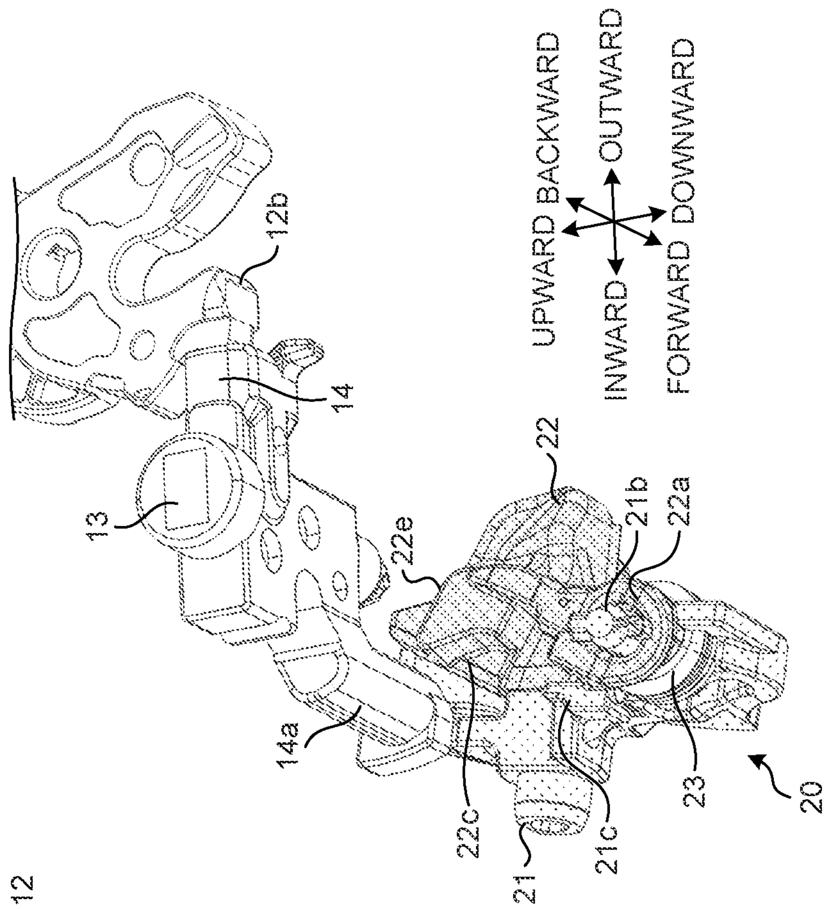
FIGS. 7A and 7B are views of the main part of the internal structure, illustrating the inertial lever portion at a non-operating position in the open link of the door latch device illustrated in FIG. 1, where
Figure 7A:
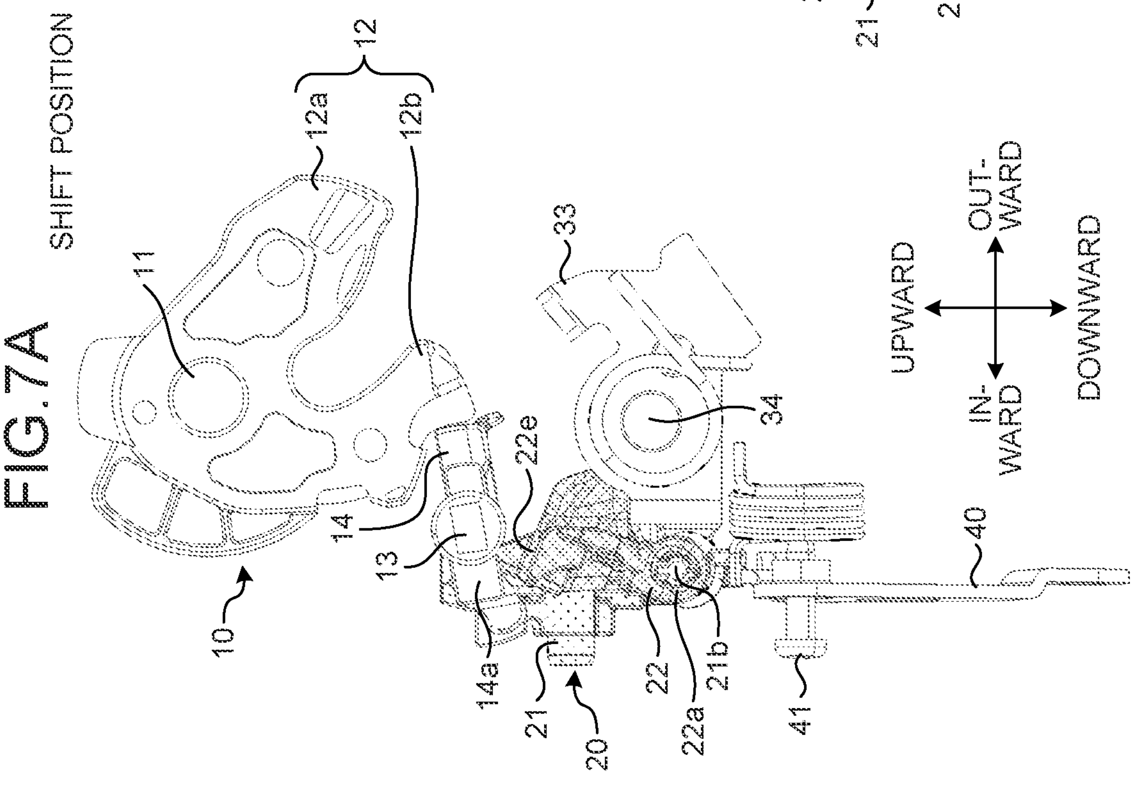

As illustrated in FIGS. 4 and 5, the ratchet 14 is integrally provided with a ratchet lever 14*a*. The ratchet lever 14*a* extends from a portion of the ratchet shaft 13 positioned near the front side of the vehicle relative to the ratchet 14, toward the inside of the vehicle. When the ratchet lever 14*a* is pressed upward against the spring force of the ratchet spring, the ratchet 14 rotates clockwise in FIG. 2, thus the engagement state between the ratchet 14 and the latch 12 is allowed to be released.

As illustrated in FIGS. 2 to 5, an open link 20 is arranged at a portion below the ratchet lever 14*a*, in the case 1. The open link 20 is provided in the case 1 so as to be movably arranged in a vertical direction by the operations of an outside handle lever 30 and an inside handle lever 40, and so as to be rotated about an axis extending in a horizontal direction of the vehicle by the operation of a lock unit 50 and changed into an unlocked state and a locked state.

As illustrated in FIG. 2, the outside handle lever 30 is arranged at a portion near the outside of the vehicle relative to the ratchet shaft 13 so as to be rotated by an outside lever shaft 31 extending in a longitudinal direction of the vehicle. Although not illustrated, the outside handle lever 30 has an end that is positioned near the outside of the vehicle and with which an outside door handle of the side door is cooperated via an outside cable 32. The outside handle lever 30 has an end 30*a* that is positioned near the inside of the vehicle, and an open lever 33 is arranged so as to be in cooperation with the end 30*a*. The open lever 33 is arranged at a portion near the inside of the vehicle on the lower side of the vehicle, relative to the outside lever shaft 31 so that the open lever 33 is rotated by an open lever shaft 34 extending in a longitudinal direction of the vehicle, and an engagement end 33*a* positioned near the inside of the vehicle is engaged with a rotation center (engagement hole 21*e* which is described later) of the open link 20.

When opening operation of the outside door handle is performed, the outside handle lever 30 rotates counterclockwise in FIG. 2 via the outside cable 32, the open lever 33 rotates clockwise in FIG. 2 with the rotation of the outside handle lever 30, and the open link 20 moves upward via the engagement end 33*a*. When the opening operation of the outside door handle is stopped in this state, the open lever 33 rotates counterclockwise by a spring force of a return spring 35, and each of the open link 20 and the outside handle lever 30 returns to the original state.

As illustrated in FIG. 3, the inside handle lever 40 is arranged at a portion below the open link 20 so as to be rotated by an inside lever shaft 41 extending in a horizontal direction of the vehicle, and a front end portion 40*a* positioned on the front side thereof faces a lower end surface of the open link 20. Although not illustrated, the inside handle lever 40 has a lower end with which an inside door handle of the side door is cooperated via an inside cable 42.

When opening operation of the inside door handle is performed, the inside handle lever 40 rotates clockwise in FIG. 3 via the inside cable 42, and the open link 20 moves upward via the front end portion 40*a* of the inside handle lever 40. At this time, the open lever 33 rotates clockwise in FIG. 2 with the upward movement of the open link 20. Accordingly, when the opening operation of the inside door handle is stopped, the open lever 33 rotates counterclockwise by the spring force of the return spring 35, and each of the open link 20 and the inside handle lever 40 returns to the original state.

As illustrated in FIG. 3, the lock unit 50 includes a lock lever 52 that rotates about an axis of a lock shaft 51 in a horizontal direction of the vehicle, and engages with the open link 20 via an engagement piece 52*a* of the lock lever 52. The lock unit 50 includes an actuator unit 53 and a lock cable 54 that are cooperated with the lock lever 52. The actuator unit 53 is operated by a lock operation and an unlock operation of a remote controller owned by a user of the vehicle to rotate the lock lever 52. The lock cable 54 transmits a lock operation and an unlock operation of a lock knob which is not illustrated provided at the side door to the lock lever 52 to rotate the lock lever 52.

In this lock unit 50, upon performance of the unlock operation of the remote controller or the lock knob, the lock lever 52 rotates clockwise in FIG. 3 via the actuator unit 53 or the lock cable 54. Therefore, the open link 20 is stood nearly upright and brought into the unlocked state by the spring force of the return spring 35 which is not illustrated, as illustrated in FIG. 4.

On the other hand, upon performance of the lock operation of the remote controller or the lock knob, the lock lever 52 rotates counterclockwise in FIG. 3 via the actuator unit 53 or the lock cable 54, in the lock unit 50. Therefore, the open link 20 rotates counterclockwise in FIG. 3 by the abutment of the engagement piece 52*a*, and is inclined forward and brought into the locked state, as illustrated in FIG. 5.

In the present embodiment, as illustrated in FIGS. 8 to 13C, the open link 20 described above includes a lever body 21, an inertial lever portion 22, and a torsion spring (bias member) 23. Note that in the drawings illustrating the open link 20, the lever body 21 and the inertial lever portion 22 are differently dotted for clarity.

The lever body 21 includes a main body base portion 21*a* and a support shaft portion 21*b* that are positioned at a lower end, and an abutment protrusion 21*c* and an engagement protrusion 21*d* that project upward from the main body base portion 21*a*. The main body base portion 21*a* is provided with the engagement hole 21*e* with which the engagement end 33*a* positioned near the inside of the vehicle in the above-described open lever 33 is engaged. The engagement hole 21*e* is a deformed hole that penetrates the main body base portion 21*a* in a horizontal direction of the vehicle, and is engaged with the engagement end 33*a* so as to be rotatable and not relatively moved in a vertical direction. The support shaft portion 21*b* has a columnar shape protruding from a portion of the main body base portion 21*a* positioned near the back side of the vehicle toward the back side of the vehicle. The abutment protrusion 21*c* protrudes upward from a portion positioned above the engagement hole 21*e* in the main body base portion 21*a*. The engagement protrusion 21*d* protrudes upward from a portion of the main body base portion 21*a* positioned near the front side of the vehicle, and has a lock engagement portion 21*f* at an upper end. The lock engagement portion 21*f* is a protrusion protruding outward, and is always engaged with the engagement piece 52*a* of the lock lever 52 described above by a spring force of a lock engagement spring 52*b* (see FIG. 3).

Upon performance of opening operation of the outside door handle or inside door handle, the lever body 21 moves upward together with the engagement end 33*a* of the open lever 33. When the lock lever 52 rotates counterclockwise in FIG. 3 with the lock operation of the remote controller or lock knob, the lever body 21 rotates about the engagement hole 21*e* and is arranged at a lock position inclined forward as illustrated in FIG. 5. On the other hand, when the lock lever 52 rotates clockwise in FIG. 3 with the unlock operation of the remote controller or lock knob, the lever body 21 rotates about the engagement hole 21*e* in the opposite direction, and is stood upright and arranged at substantially an unlock position as illustrated in FIG. 4. The lock position and the unlock position of the lever body 21 correspond to the locked state and the unlocked state of the open link 20, respectively. In other words, the open link 20 is brought into the locked state when the lever body 21 is arranged at the lock position, and the open link 20 is brought into the unlocked state when the lever body 21 is arranged at the unlock position.

The inertial lever portion 22 includes an insertion portion 22*a* at a lower end, and an inertial mass portion 22*b* and a block portion 22*c* that protrude upward from the insertion portion 22*a*. The insertion portion 22*a* is provided with an insertion hole 22*d* through which the support shaft portion 21*b* of the lever body 21 is rotatably inserted. The inertial mass portion 22*b* is configured so that the mass of an upper end is larger than that of a lower end in the inertial lever portion 22, and includes a press abutment surface 22*e* that is substantially flat at the upper end. The block portion 22*c* protrudes inward near the front side of the vehicle relative to the inertial mass portion 22*b*. As illustrated in FIGS. 11A to 13C, the inertial lever portion 22 is arranged at the lever body 21 by inserting the support shaft portion 21*b* into the insertion hole 22*d*. The inertial lever portion 22 arranged at the lever body 21 is rotatable about an axis of the support shaft portion 21*b* relative to the lever body 21, is movable along the axis of the support shaft portion 21*b*, and is configured to be arranged to be inclined so that the upper end is positioned backward around the lower end.

Figure 11C:
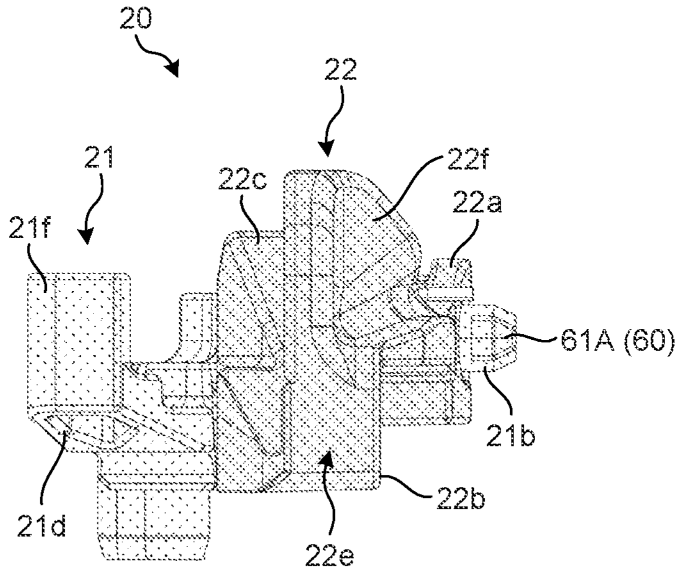
FIGS. 11A to 11C is views of the inertial lever portion at the operating position in the open link of the door latch device illustrated in FIG. 1, where
Figure 11A:
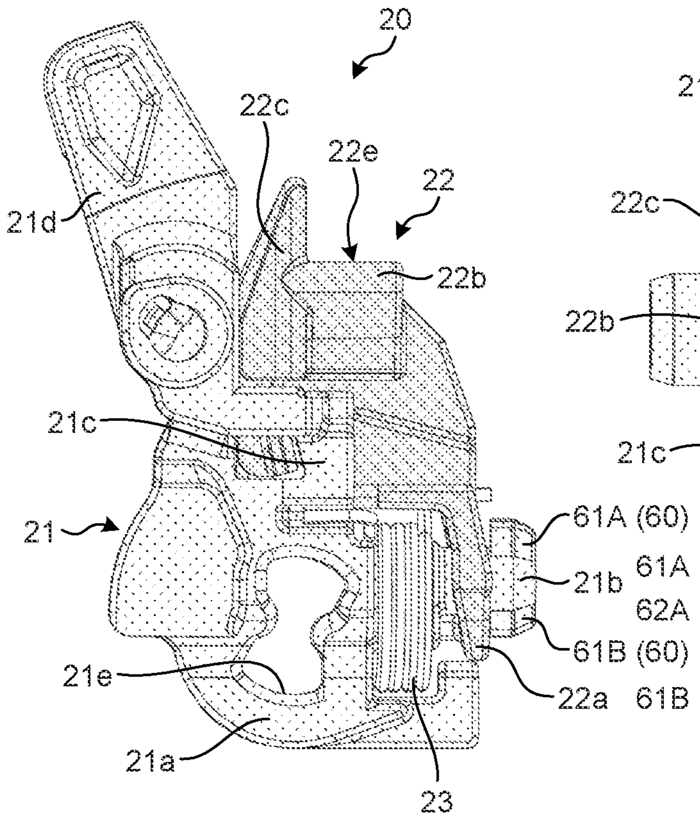
Figure 11B:
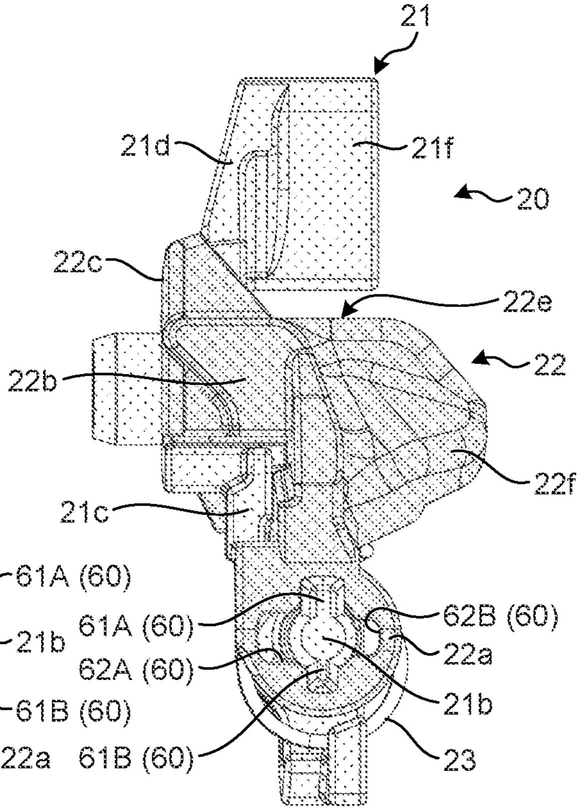

As illustrated in FIGS. 11A to 11C, when the inertial mass portion 22*b* is arranged substantially vertically upward in a state where an axis of the insertion hole 22*d* is substantially parallel with the axis of the support shaft portion 21*b* and is positioned on the foremost side to the lever body 21, the inertial lever portion 22 is positioned at an operating position, and the inertial mass portion 22*b* abuts on a portion of the abutment protrusion 21*c* positioned near the outside of the vehicle. At this time, the block portion 22*c* of the inertial lever portion 22 is arranged between the abutment protrusion 21*c* of the lever body 21 and the engagement protrusion 21*d*, and the abutment protrusion 21*c* and the block portion 22*c* face each other in the longitudinal direction of the vehicle.

Figure 12C:
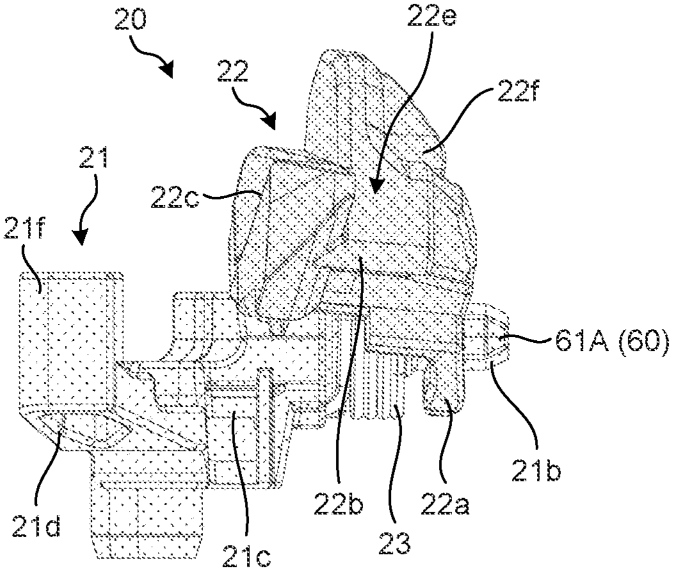
FIGS. 12A to 12C is views of the inertial lever portion at the non-operating position (sensing position) in the open link of the door latch device illustrated in FIG. 1, where
Figure 12A:
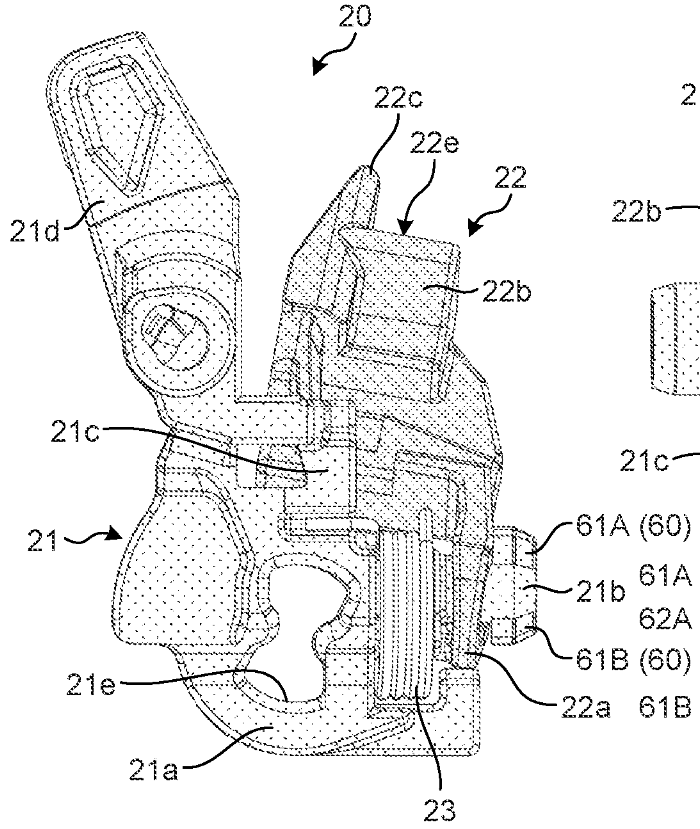
Figure 12B:
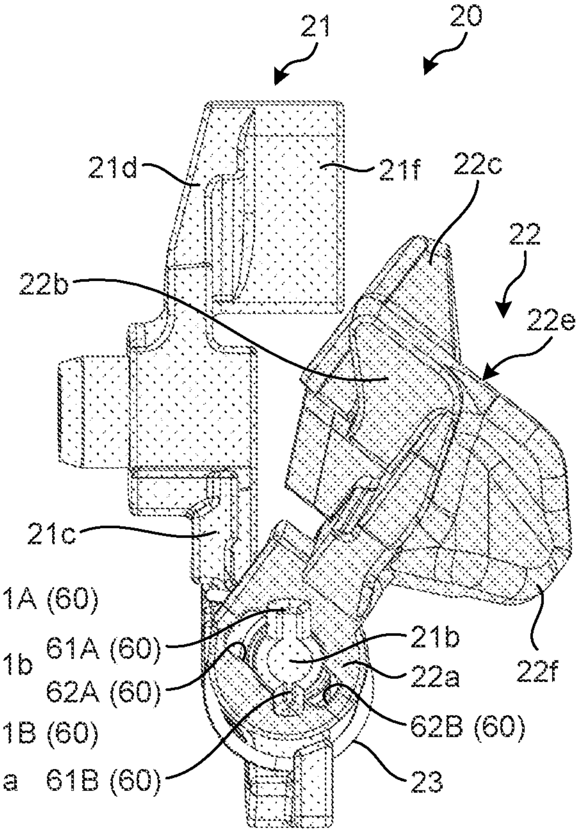
Figure 13C:
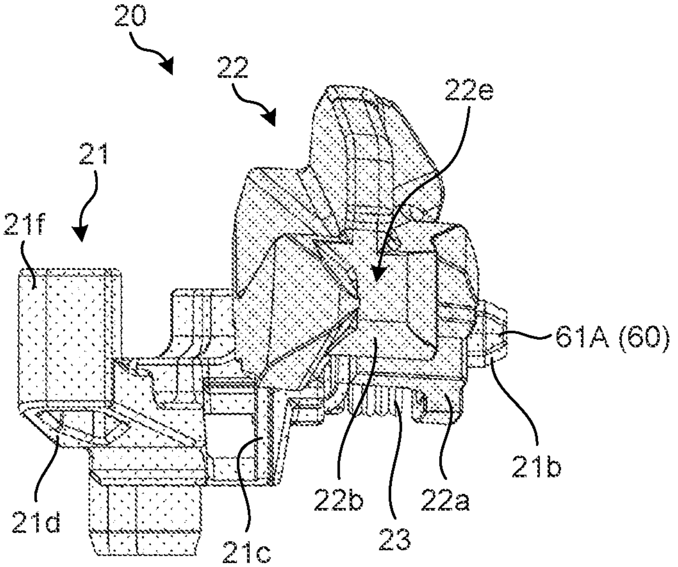
FIGS. 13A to 13C is views of the inertial lever portion at the non-operating position (shift position) in the open link of the door latch device illustrated in FIG. 1, where
Figure 13A:
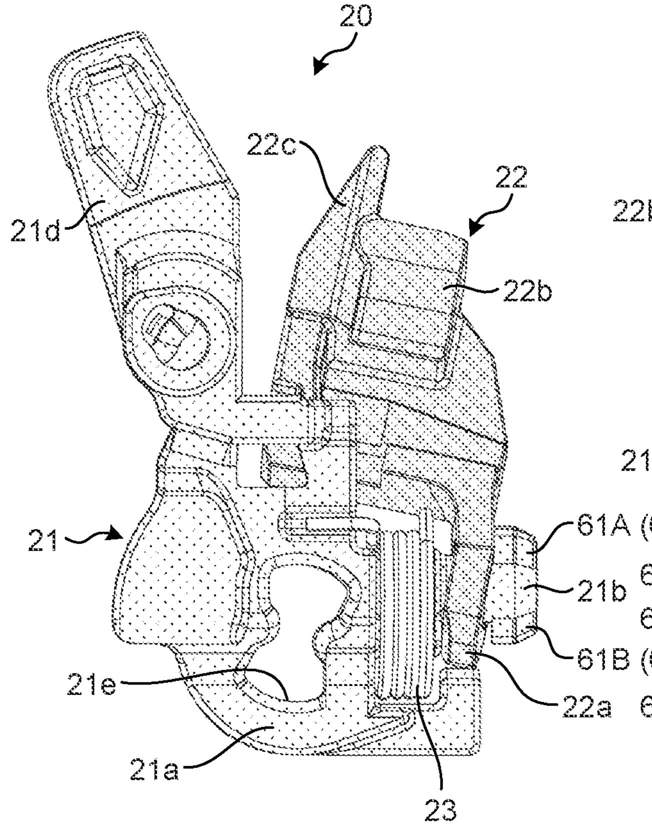
Figure 13B:
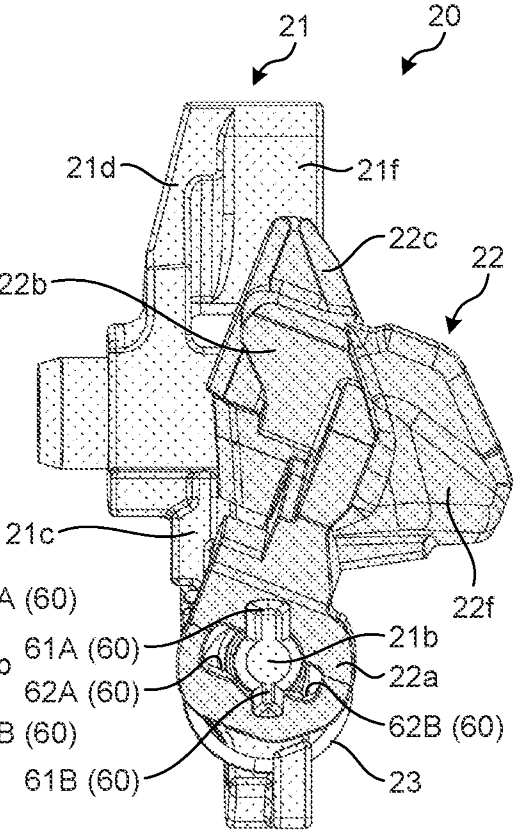

Meanwhile, when the inertial lever portion 22 rotates clockwise to the lever body 21 as viewed from the back side of the vehicle, as illustrated in FIGS. 12A to 12C, the block portion 22*c* disengages from between the abutment protrusion 21*c* and the engagement protrusion 21*d* of the lever body 21 for movement to the backside of the vehicle (sensing position of the inertial lever portion 22: non-operating position), and then, the inertial mass portion 22*b* is tilted backward (shift position of the inertial lever portion 22: non-operating position), as illustrated in FIGS. 13A to 13C. At this time, the abutment protrusion 21*c* and the block portion 22*c* are arranged so as to face each other in a circumferential direction.

The case 1 is provided with a returning abutment protrusion (stopper portion: returning portion) 3 at a position abutting on the inertial mass portion 22*b* and the block portion 22*c* so as to limit a rotation range of the inertial lever portion 22. The returning abutment protrusion 3 abuts on the inertial mass portion 22*b* and the block portion 22*c* when the inertial lever portion 22 is rotated toward the outside of the vehicle relative to the lever body 21 in the state where the inertial lever portion is arranged at the operating position, restricting the subsequent rotations of the inertial lever portion 22. In the present embodiment, the returning abutment protrusion 3 is configured to abut on the inertial mass portion 22*b* and the block portion 22*c*, only when the inertial lever portion 22 rotates beyond the sensing position relative to the lever body 21. In other words, the returning abutment protrusion 3 and the inertial lever portion 22 are configured so that abutment of the returning abutment protrusion 3 on the inertial mass portion 22*b* and the block portion 22*c* is prevented upon rotation of the inertial lever portion 22 within a range of substantially 20° from the operating position to the sensing position, and are configured so that the returning abutment protrusion 3 abuts on the inertial mass portion 22*b* and the block portion 22*c* upon rotation of the rotation of the inertial lever portion 22 to substantially 30° beyond the sensing position.

The torsion spring 23 is interposed between the main body base portion 21*a* of the lever body 21 and the insertion portion 22*a* of the inertial lever portion 22 so as to be wound around the support shaft portion 21*b*, and has one end cooperated with the lever body 21 and the other end cooperated with the inertial lever portion 22. This torsion spring 23 is rotationally biased about the axis of the support shaft portion 21*b* to function to maintain a state where the inertial mass portion 22*b* of the inertial lever portion 22 abuts on the abutment protrusion 21*c* of the lever body 21 is biased in an axial direction of the support shaft portion 21*b* to function to maintain a state where the block portion 22*c* abuts on the abutment protrusion 21*c*.

The abutment protrusion 21*c* of the lever body 21 is provided with a restriction protrusion 21*g*, and the inertial mass portion 22*b* of the inertial lever portion 22 is provided with a returning bulge 22*f*. The restriction protrusion 21*g* protrudes from an upper end of the abutment protrusion 21*c* toward the outside of the vehicle. In a state where the abutment protrusion 21*c* and the block portion 22*c* are arranged so as to face each other in the circumferential direction, the restriction protrusion 21*g* abuts on a front end of the block portion 22*c* and functions to prevent the inertial lever portion 22 from moving forward. In this state, when the inertial lever portion 22 is rotated clockwise relative to the lever body 21 against a spring force of the torsion spring 23 as viewed from the back side of the vehicle, the abutment state between the restriction protrusion 21*g* and the block portion 22*c* is allowed to be released to move the inertial lever portion 22 forward relative to the lever body 21.

Figure 14A:
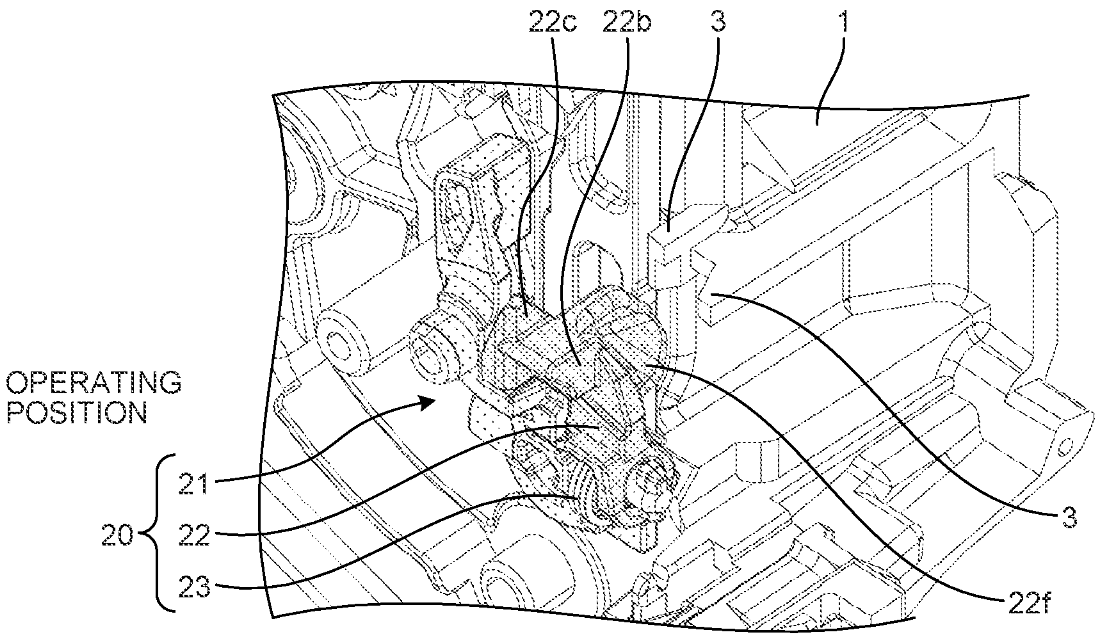
FIGS. 14A and 14B is perspective views of relative positions between the open link of the door latch device illustrated in FIG. 1 and the case, where
Figure 14B:
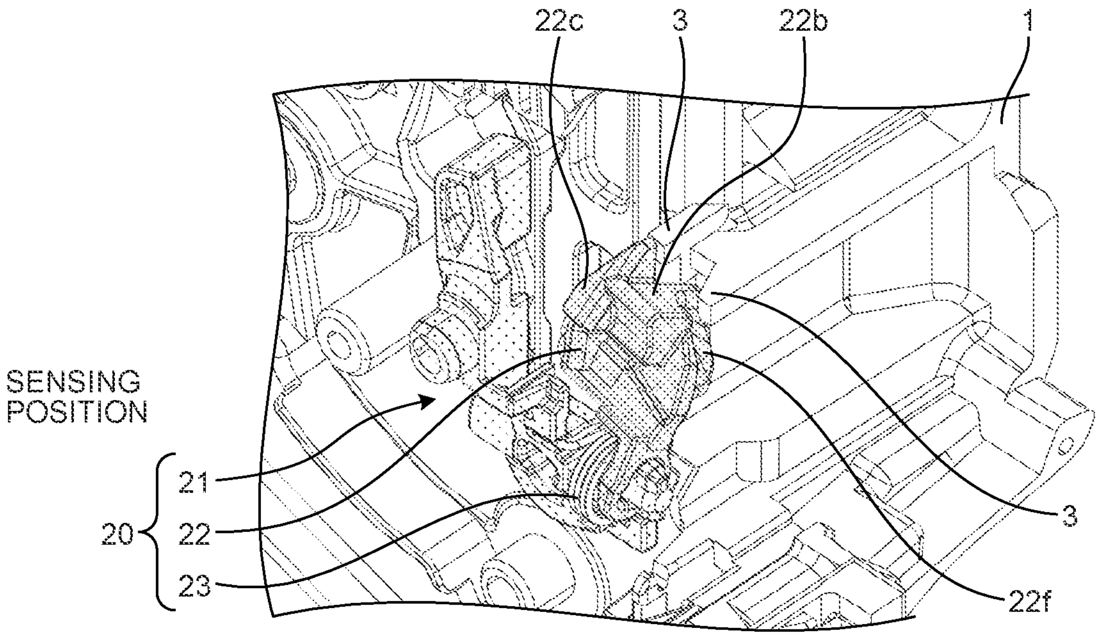

The returning bulge 22*f* is a protruding portion provided at a portion of the inertial mass portion 22*b* near the back side and outside of the vehicle. When the opening operation of the outside door handle or opening operation of the inside door handle is performed with a stroke larger than that in usual in a state where the inertial lever portion 22 is arranged at the shift position, the returning bulge 22*f* functions, as illustrated in FIGS. 14A and 14B, to abut on the returning abutment protrusion 3 provided in the case 1, rotate the inertial lever portion 22 toward the outside of the vehicle relative to the lever body 21, against the spring force of the torsion spring 23, and then move the inertial lever portion 22 toward the front side of the vehicle. In other words, when the opening operation of the outside door handle or opening operation of the inside door handle is performed with a stroke larger than that in usual, in a state where the inertial lever portion 22 is arranged at the shift position, the open link 20 moves upward in a state where the returning bulge 22*f* abuts on the returning abutment protrusion 3 of the case 1. When the open link 20 moves upward in a state where the returning bulge 22*f* of the inertial lever portion 22 abuts on the returning abutment protrusion 3 of the case 1, the inertial lever portion 22 rotates toward the outside of the vehicle with respect to the lever body 21, and the abutment state between the restriction protrusion 21*g* and the block portion 22*c* is released. Then, when the inertial lever portion 22 is moved toward the front side of the vehicle relative to the lever body 21 by the returning abutment protrusion 3, the restriction on the movement of the inertial lever portion 22 in a rotation direction by the returning abutment protrusion 3 is released, and the inertial lever portion 22 returns to the operating position through the sensing position by the spring force of the torsion spring 23 in the rotation direction. The returning bulge 22*f* and the returning abutment protrusion 3 are configured not to abut on each other and allow upward movement of the open link 20, when the inertial lever portion 22 is arranged at the operating position.

Furthermore, the door latch device is provided with an engagement mechanism 60 between the support shaft portion 21*b* of the lever body 21 and the insertion portion 22*a* of the inertial lever portion 22. The engagement mechanism 60 allows the movement of the support shaft portion 21*b* in the axial direction relative to the insertion hole 22*d* when the inertial lever portion 22 is arranged at a predetermined attachment/detachment position relative to the lever body 21, and meanwhile, mutual engagement in the engagement mechanism 60 restricts the movement of the support shaft portion 21*b* in the axial direction relative to the insertion hole 22*d*, when the inertial lever portion 22 is arranged at the operating position, sensing position, or shift position. In other words, when the inertial lever portion 22 is arranged at the attachment/detachment position relative to the lever body 21, the engagement mechanism 60 allows the movement of the support shaft portion 21*b* relative to the insertion hole 22*d* in the axial direction to allow operation for attachment/detachment of the inertial lever portion 22 to/from the lever body 21. When the inertial lever portion 22 is arranged at a position other than the attachment/detachment position, such as the operating position, relative to the lever body 21, the engagement mechanism 60 functions to restrict the movement of the support shaft portion 21*b* relative to the insertion hole 22*d* in the axial direction to prevent the attachment/detachment of the inertial lever portion 22 to/from the lever body 21.

In the present embodiment, two engagement protruding portions 61A and 61B are provided at an end of the support shaft portion 21*b* and two insertion cutout portions 62A and 62B are formed on an inner peripheral surface of the insertion hole 22*d*, constituting the engagement mechanism

Figure 10:
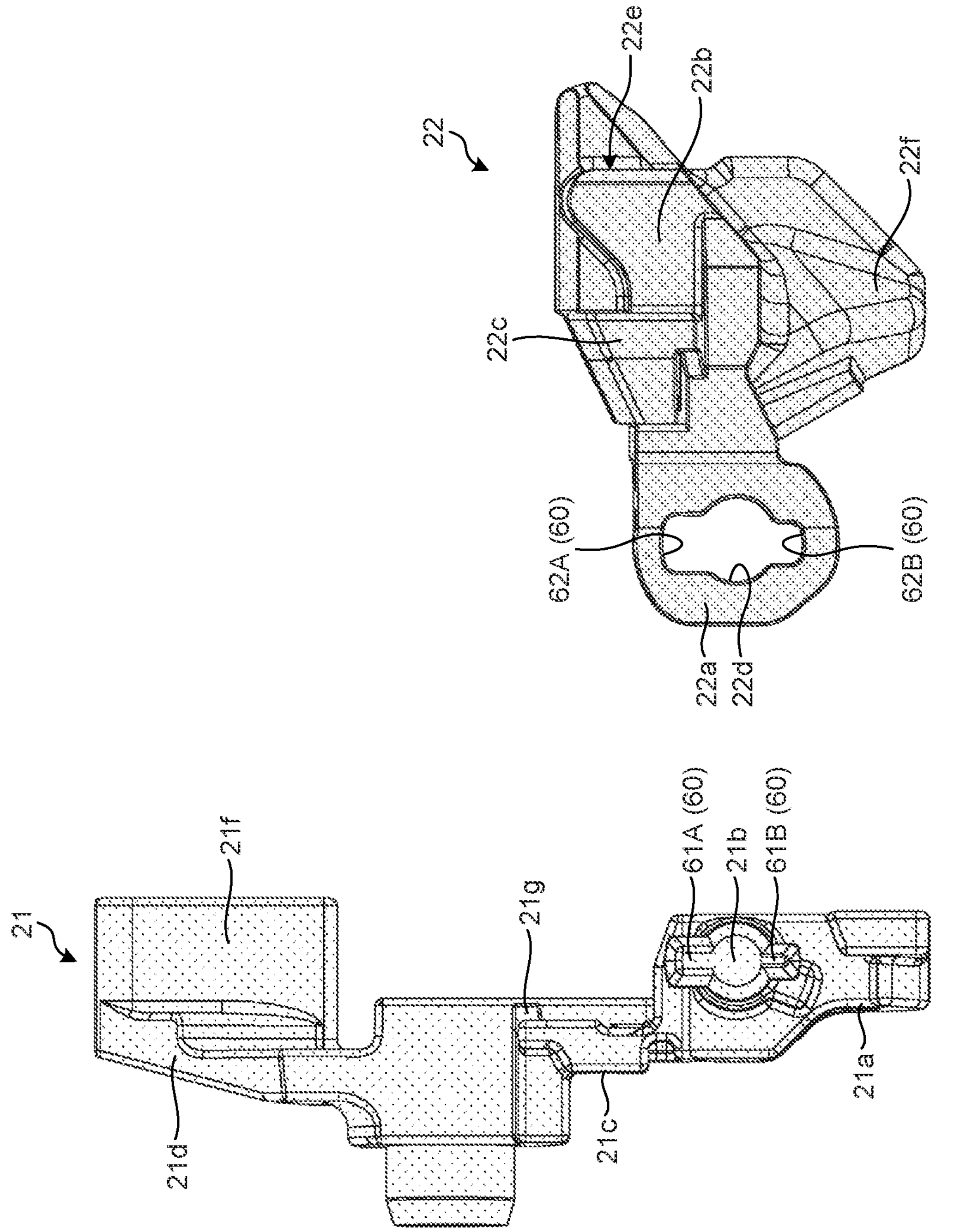
FIG. 10 is an exploded view of a lever body constituting the open link of the door latch device illustrated in FIG. 1 and the inertial lever portion arranged at an attachment/detachment position with respect to the lever body, as viewed from a back side of the vehicle.

60. The two engagement protruding portions 61A and 61B protrude radially from positions shifted from each other by 180° in the circumferential direction of the support shaft portion 21*b*, and are configured to have different widths. The two insertion cutout portions 62A and 62B are formed at positions shifted from each other by 180° in the circumferential direction of the insertion hole 22*d*, and are formed to have widths corresponding to the engagement protruding portions 61A and 61B. In other words, the insertion cutout portion 62A of large width is configured to receive the insertion of the engagement protruding portion 61A of large width, and the insertion cutout portion 62B of small width is configured to receive the insertion of the engagement protruding portion 61B of small width and not to receive the insertion of the engagement protruding portion 61A of large width. As illustrated in FIG. 10, the engagement protruding portions 61A and 61B and the insertion cutout portions 62A and 62B are provided at the lever body 21 and the inertial lever portion 22 in order that when the inertial mass portion 22*b* of the inertial lever portion 22 is arranged substantially horizontally toward the outside of the vehicle (attachment/detachment position) in a state where the engagement protrusion 21*d* of the lever body 21 is arranged substantially vertically upward, the engagement protruding portion 61A and the insertion cutout portion 62A having the corresponding widths match each other and the engagement protruding portion 61B and the insertion cutout portion 62B having the corresponding widths match each other. Therefore, at a position where the inertial lever portion 22 is shifted by 180° relative to the lever body 21, the engagement protruding portion 61A of large width faces the insertion cutout portion 62B of small width. Accordingly, when the inertial lever portion 22 is arranged at an incorrect attachment/detachment position relative to the lever body 21, the engagement protruding portion 61A fails to be inserted into the insertion cutout portion 62B, and wrong assembly can be prevented in advance.

Figure 8:
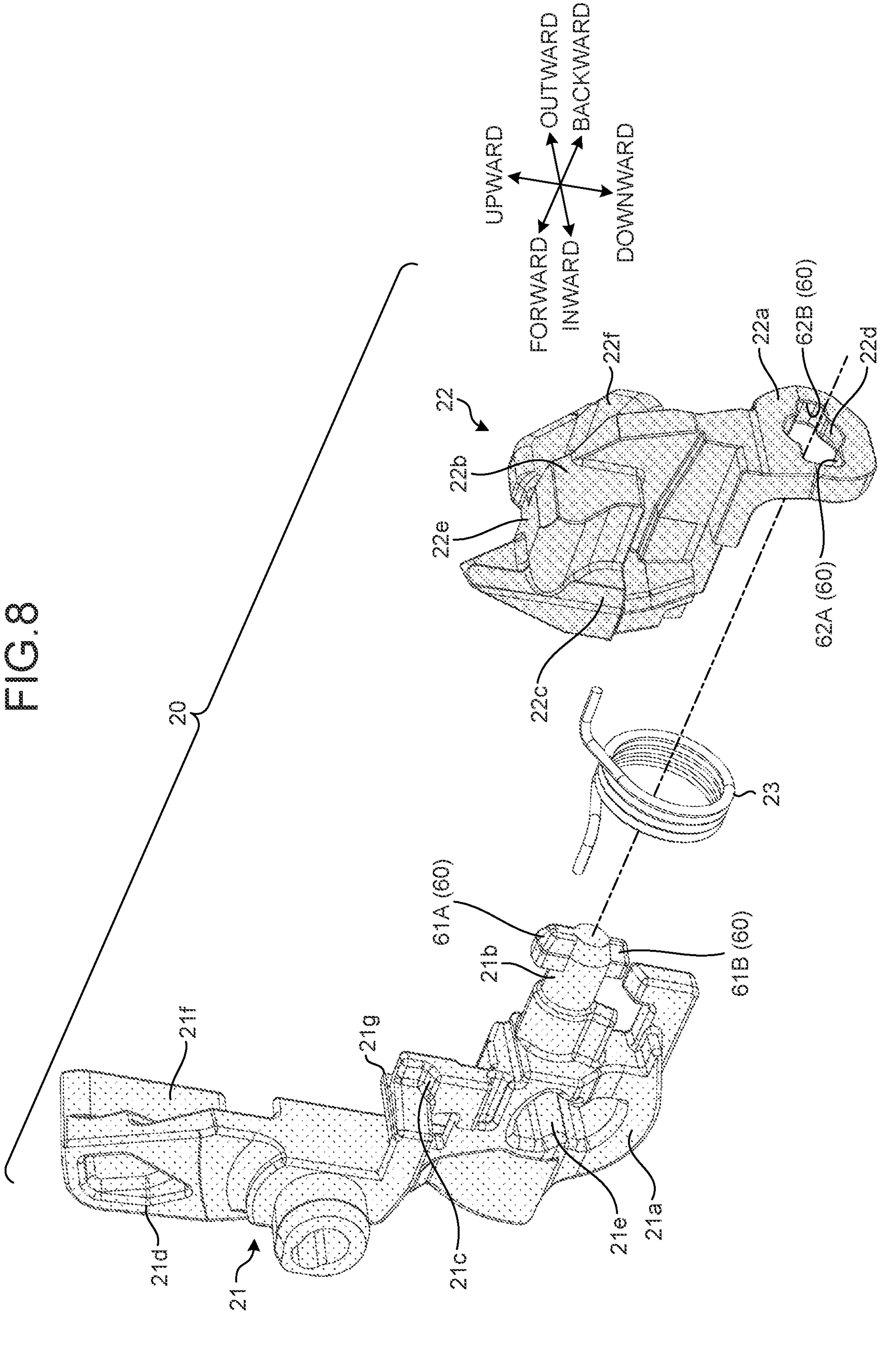
FIG. 8 is an exploded perspective view of the open link of the door latch device illustrated in FIG. 1 as viewed from inside the vehicle.
Figure 9:
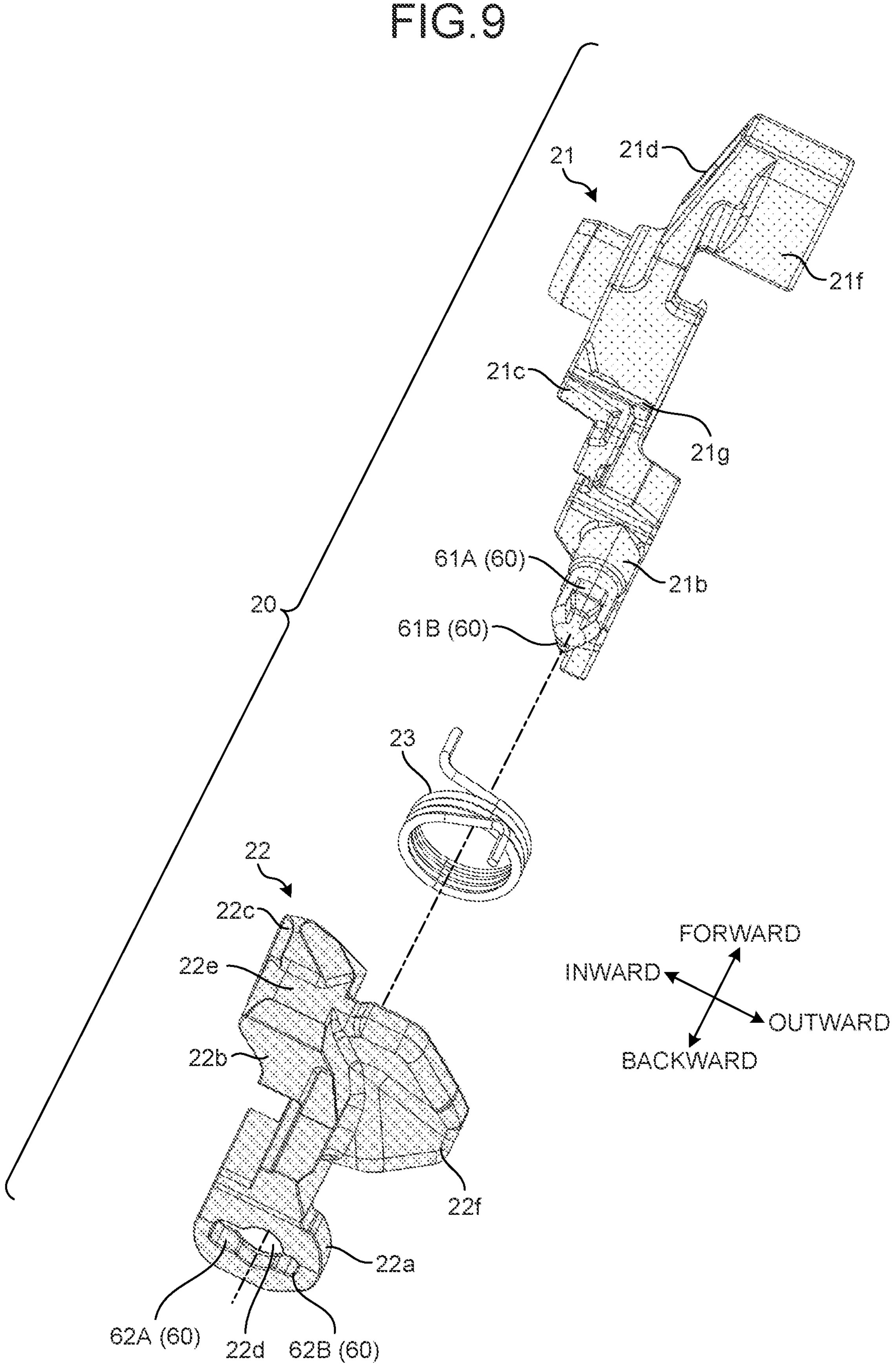
FIG. 9 is an exploded perspective view of the open link of the door latch device illustrated in FIG. 1 as viewed from above the vehicle.

As illustrated in FIGS. 8 to 10, in order to mount the inertial lever portion 22 to the lever body 21, first, the torsion spring 23 is mounted to the support shaft portion 21*b* so that one end thereof is cooperated with the lever body 21 and the other end thereof is cooperated with the inertial lever portion 22. In this state, preferably, the inertial lever portion 22 is arranged so as to be at the attachment/detachment position against the spring force of the torsion spring 23 in the rotation direction, and further, the support shaft portion 21*b* is inserted into the insertion hole 22*d* of the insertion portion 22*a* against the spring force of the torsion spring 23 in the axial direction. When an operation force is removed from the inertial lever portion 22 after the two engagement protruding portions 61A and 61B pass through the insertion cutout portions 62A and 62B, the inertial lever portion 22 is rotated toward the operating position by the spring force of the torsion spring 23 in the rotation direction, and therefore, the positions of the engagement protruding portions 61A and 61B are shifted from the insertion cutout portions 62A and 62B. Accordingly, the engagement protruding portions 61A and 61B abut on an end surface on the back side of the insertion portion 22*a*, and a state where the insertion portion 22*a* is externally fitted on the support shaft portion 21*b* is maintained. Thereafter, when the inertial lever portion 22 is appropriately moved against the spring force of the torsion spring 23 and the block portion 22*c* is arranged between the abutment protrusion 21*c* and the engagement protrusion 21*d* of the lever body 21, the open link 20 in a state where the inertial lever portion 22 is arranged at the operating position is allowed to be configured. Therefore, in the work of assembling the lever body 21, the inertial lever portion 22, and the torsion spring 23 to constitute the open link 20, it is not necessary to prepare a screw as a separate component or threadedly engage the screw, and the manufacturing operation can be facilitated and cost reduction and weight reduction can be achieved.

As illustrated in FIGS. 1 to 7B, the open link 20 configured as described above is mounted to the vehicle via the case 1 in a state where the support shaft portion 21*b* of the lever body 21 extends in the longitudinal direction of the vehicle and the inertial lever portion 22 is arranged at the operating position. In normal use, the inertial lever portion 22 is maintained at the operating position by the spring force of the torsion spring 23 in the rotation direction. Therefore, as illustrated in FIG. 4, when the lever body 21 is arranged at the unlock position, that is, when the open link 20 is in the unlocked state, the press abutment surface 22*e* of the inertial lever portion 22 faces a lower surface of the ratchet lever 14*a*. Therefore, when the lever body 21 moves upward by the opening operation of the outside door handle or opening operation of the inside door handle, the ratchet lever 14*a* moves upward via the press abutment surface 22*e*, the engagement state of the ratchet 14 with the latch 12 is released, and the side door is allowed to be opened.

Meanwhile, upon lock operation of the remote controller or lock knob, the lock lever 52 rotates counterclockwise in FIG. 3, the lever body 21 and the inertial lever portion 22 are integrally inclined forward, and the open link 20 is brought into the locked state. At this time, as illustrated in FIG. 5, the press abutment surface 22*e* of the inertial lever portion 22 is arranged forward from the ratchet lever 14*a*, and therefore, even when the lever body 21 moves upward by the opening operation of the outside door handle or opening operation of the inside door handle, the inertial lever portion 22 does not abut on the ratchet lever 14*a*, and the engagement state of the ratchet 14 with the latch 12 is maintained. Accordingly, when the door latch device is in the locked state, the side door remains closed to the vehicle, even when the outside door handle or inside door handle is operated.

When a horizontal impact force is applied to the vehicle described above due to a collision from a lateral side or the like, the inertial lever portion 22 having the upper end as the inertial mass portion 22*b* rotates relative to the lever body 21 against the spring force of the torsion spring 23 in the rotation direction. At this time, as described above, when the inertial lever portion 22 rotates relative to the lever body 21 beyond the sensing position, the returning abutment protrusion 3 abuts on the inertial mass portion 22*b* and the block portion 22*c*, and therefore, the engagement protruding portion 61A and the insertion cutout portion 62A, and the engagement protruding portion 61B and the insertion cutout portion 62B do not match. Therefore, even when the impact force is applied to the vehicle, there is no possibility that the inertial lever portion 22 may disengage from the lever body 21. When the inertial lever portion 22 reaches the sensing position, the inertial lever portion 22 moves to the shift position relative to the lever body 21 by the spring force of the torsion spring 23 in the axial direction. Therefore, the abutment protrusion 21*c* and the block portion 22*c* overlap each other in the circumferential direction, and the inertial lever portion 22 does not return to the operating position through the sensing position by the spring force of the torsion spring 23 in the rotation direction. Therefore, in this state, as illustrated in FIGS. 13A to 13C, even when the open link 20 is in the unlocked state and the lever body 21 is moved upward by the opening operation of the outside door handle or opening operation of the inside door handle, the press abutment surface 22*e* does not abut on the ratchet lever 14*a*, and the engagement state of the ratchet 14 with the latch 12 is maintained. Accordingly, it is possible to prevent the side door from being unexpectedly opened immediately after the impact force such as a collision from a lateral side is applied to the vehicle.

Moreover, in the above state, at a position where the block portion 22*c* exceeds the restriction protrusion 21*g*, the inertial lever portion 22 rotates counterclockwise when viewed from the back side of the vehicle by the spring force of the torsion spring 23 in the rotation direction, and a front end surface of the block portion 22*c* is maintained to face the restriction protrusion 21*g*, preventing forward movement of the inertial mass portion 22*b* of the inertial lever portion 22 to the lever body 21. In other words, after the inertial lever portion 22 is arranged at the shift position relative to the lever body 21, even if the outside door handle or the inside door handle moves in the same direction as that of the opening operation due to the influence of the impact force applied to the vehicle, the inertial lever portion 22 does not return to the operating position through the sensing position, making it possible to more reliably prevent the side door from being unexpectedly opened.

Note that the above embodiments exemplify the door latch device mounted to the side door of the four-wheeled vehicle, but the door latch device may be mounted on other types of vehicles. In this case, the door does not necessarily need to be provided on a side surface of the vehicle, or the door does not need to have a hinge shaft extending in a vertical direction as well.

Furthermore, the above embodiments exemplify the inertial lever portion 22 rotating to the sensing position relative to the lever body 21 and then moving to the shift position, but in the present disclosure, it will suffice to arrange the inertial lever portion 22 at the sensing position, and the inertial lever portion 22 does not always need to be moved to the shift position.

Furthermore, in the above-described embodiments, the support shaft portion 21*b* is provided at the lever body 21 and the insertion portion 22*a* is provided in the inertial lever portion 22, but the support shaft portion may be provided at the inertial lever portion 22 and the insertion portion may be provided in the lever body.

Furthermore, the above embodiments exemplify the lever body 21 and the inertial lever portion 22 that are moved along the axis of the support shaft portion 21*b* and the support shaft portion 21*b* that is inserted into the insertion hole 22*d* of the insertion portion 22*a*, but the present disclosure is not limited thereto. For example, a cutout may be formed in the insertion portion 22*a* by partially cutting out the insertion hole 22*d* radially so that the support shaft portion 21*b* is moved in the radial direction through the cutout, whereby the insertion portion can be externally fitted around the support shaft portion. In this case, it is preferable to form the cutout provided in the insertion portion to have a width smaller than an outer diameter of the support shaft portion, to provide a small diameter portion at part of the support shaft portion so as to pass through the cutout, and to provide a portion having a diameter larger than that of the insertion hole at an end of the support shaft portion. The small diameter portion does not need to have a circular cross section and preferably has, for example, a width across flat.

Note that in the above embodiments, the engagement mechanism 60 includes two sets of the engagement protruding portions 61A and 61B and the insertion cutout portions 62A and 62B so as to relatively move the lever body 21 and the inertial lever portion 22 along the axis of the support shaft portion 21*b*, but at least one set will suffice. In addition, two sets of the engagement protruding portions 61A and 61B and the insertion cutout portions 62A and 62B are provided to be shifted from each other by 180° in the circumferential direction, but may be provided at positions shifted by an angle other than 180°. In this case, the two sets may have the same width.

Furthermore, it is also possible to apply, as the engagement protruding portion, a configuration to be press-fitted into the insertion cutout portion. In other words, if, as the engagement protruding portion, a configuration elastically deformable and having a size slightly larger than that of the insertion cutout portion is applied, the engagement protruding portion is elastically deformed to pass through the insertion cutout portion, but the size of the engagement protruding portion having passed through the insertion portion becomes larger than that of the insertion cutout portion, and the passage thereof is restricted. Therefore, as long as the support shaft portion of the lever body is inserted into the insertion hole of the inertial lever portion, the support shaft portion is unlikely to disengage from the insertion hole by the spring force of the torsion spring in the axial direction even immediately after the insertion of the support shaft, and the assembling work is facilitated.

Furthermore, in the above-described embodiment, the inertial mass portion 22*b* and the block portion 22*c* are caused to abut on the returning abutment protrusion 3 of the case 1 to restrict the rotation of the inertial lever portion 22, but it will suffice to cause only one of the inertial mass portion 22*b* and the block portion 22*c* to abut on the returning abutment protrusion 3. Furthermore, the returning abutment protrusion 3 having abutted on the returning bulge 22*f* also functions to return the inertial lever portion 22 from the shift position to the operating position, but the returning abutment protrusion 3 does not always need to have a function of returning the inertial lever portion 22.

According to the present disclosure, if one support shaft portion is fitted in the other insertion portion, the lever body and the inertial lever portion are arranged relatively rotatably, and when the inertial lever portion is arranged at the operating position and the non-operating position with respect to the lever body, the engagement mechanism prevents insertion/removal of the support shaft portion to/from the insertion hole. Therefore, it is unnecessary to prepare a screw as a separate component or to threadedly engage the screw, making it possible to facilitate the manufacturing operation of the door latch device.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A door latch device comprising:

an open link configured to change to an unlocked state and a locked state and operate upon opening operation of a door handle; and a ratchet lever configured to release an engagement state of a ratchet with a latch when an operation force is applied via the open link, the open link including:

a lever body configured to displace to an unlock position corresponding to the unlocked state and a lock position corresponding to the locked state and move according to an opening operation of the door handle;

an inertial lever portion configured to rotate relative to the lever body about a predetermined axis to move to an operating position and a non-operating position; and a bias member configured to bias the inertial lever portion relative to the lever body in a rotation direction such that the inertial lever portion is maintained at the operating position, wherein the operation force is transmitted to the ratchet lever only when the opening operation of the door handle is performed while the lever body is arranged at the unlock position and the inertial lever portion is arranged at the operating position, wherein a support shaft portion is provided at one of the lever body and the inertial lever portion, and an insertion portion having an insertion hole is provided in the other of the lever body and the inertial lever portion, the insertion portion being externally fitted around the support shaft portion through the insertion hole to arrange the lever body and the inertial lever portion so as to be rotatable relative to each other, and wherein an engagement mechanism is provided between the support shaft portion and the insertion portion, the engagement mechanism being configured to:

permit insertion/removal of the support shaft portion to/from the insertion hole when the inertial lever portion is located at a predetermined attachment/detachment position relative to the lever body; and prevent the insertion/removal of the support shaft portion to/from the insertion hole when the inertial lever portion is arranged at the operating position and the non-operating position relative to the lever body.

2. The door latch device according to claim 1, wherein the support shaft portion and the insertion portion are being configured to move relative to each other in an axial direction to insert/remove the support shaft portion to/from the insertion hole, and the attachment/detachment position is provided at a position to which the inertial lever portion is further rotated beyond the non-operating position from the operating position, relative to the lever body.

3. The door latch device according to claim 2, wherein the engagement mechanism includes:

at least one engagement protruding portion that is provided so as to be radially protruded from a tip end of the support shaft portion; and at least one insertion cutout portion that is formed in the insertion portion in a radial direction, from an inner peripheral surface of the insertion hole, and wherein the engagement protruding portion matches the insertion cutout portion only when the inertial lever portion is positioned at the attachment/detachment position relative to the lever body, and the engagement protruding portion passes through the insertion cutout portion by relative movement of the lever body and the inertial lever portion in an axial direction of the support shaft portion.

4. The door latch device according to claim 3, wherein the engagement protruding portions and the insertion cutout portions are provided at positions shifted from each other by 180° in a circumferential direction of the support shaft portion, and one of the engagement protruding portions is formed so as to be inserted into one of the insertion cutout portions and so as not to be inserted into the other of the insertion cutout portions.

5. The door latch device according to claim 1, wherein the lever body is provided with the support shaft portion.

6. The door latch device according to claim 1, wherein a case configured to house the inertial lever portion, is provided with a stopper portion that permits rotation of the inertial lever portion to the non-operating position relative to the lever body but abuts on the inertial lever portion rotating beyond the non-operating position to prevent rotation of the inertial lever portion to the attachment/detachment position.

7. The door latch device according to claim 1, wherein a case configured to house the inertial lever portion, is provided with a returning portion that abuts on the inertial lever portion when opening operation of the door handle is performed with a predetermined returning stroke in a state where the inertial lever portion is arranged at the non-operating position, and returns the inertial lever portion to the operating position.

* * * * *